United States Patent [19]

Rauscher

[11] 4,112,170
[45] Sep. 5, 1978

[54] COMPOSITE GLASS ARTICLES FOR CHANNEL PLATE FABRICATION

[75] Inventor: Herbert E. Rauscher, Painted Post, N.Y.

[73] Assignee: Corning Glass Works, Corning, N.Y.

[21] Appl. No.: 749,677

[22] Filed: Dec. 13, 1976

[51] Int. Cl.² .......................... B32B 7/02; B32B 17/06
[52] U.S. Cl. ...................................... 428/212; 106/54; 156/663; 156/633; 350/96.25; 350/96.34; 428/114; 428/137; 428/188; 428/292; 428/373; 428/394; 428/428; 428/427
[58] Field of Search ............... 428/428, 373, 137, 188, 428/114, 294, 212, 427, 392; 350/96 B, 96 M, 96.24, 96.25, 96.26, 96.27, 96.34; 106/54; 156/663, 633, 657; 65/31

[56] References Cited

U.S. PATENT DOCUMENTS

| 3,294,504 | 12/1966 | Hicks | 350/96 B |
|---|---|---|---|
| 3,502,455 | 3/1970 | Gardner | 350/96 B |
| 3,607,322 | 9/1971 | Brady | 106/54 |
| 3,844,801 | 10/1974 | Wolf | 106/54 |
| 3,879,207 | 4/1975 | Hartman | 106/54 |
| 3,924,927 | 12/1975 | Wolf | 428/428 |
| 3,999,836 | 12/1976 | Wolf | 350/96 B |

*Primary Examiner*—Ellis Robinson
*Attorney, Agent, or Firm*—Kees van der Sterre; Clinton S. Janes, Jr.; Clarence R. Patty, Jr.

[57] ABSTRACT

A composite glass article for channel plate fabrication comprising a glass matrix in which is encased an array of leachable glass core elements, the core elements being composed of a $BaO$-$B_2O_3$-$SiO_2$ glass exhibiting improved leaching characteristics as well as thermal expansion and high temperature softening properties compatible with the glass matrix, is described.

4 Claims, 1 Drawing Figure

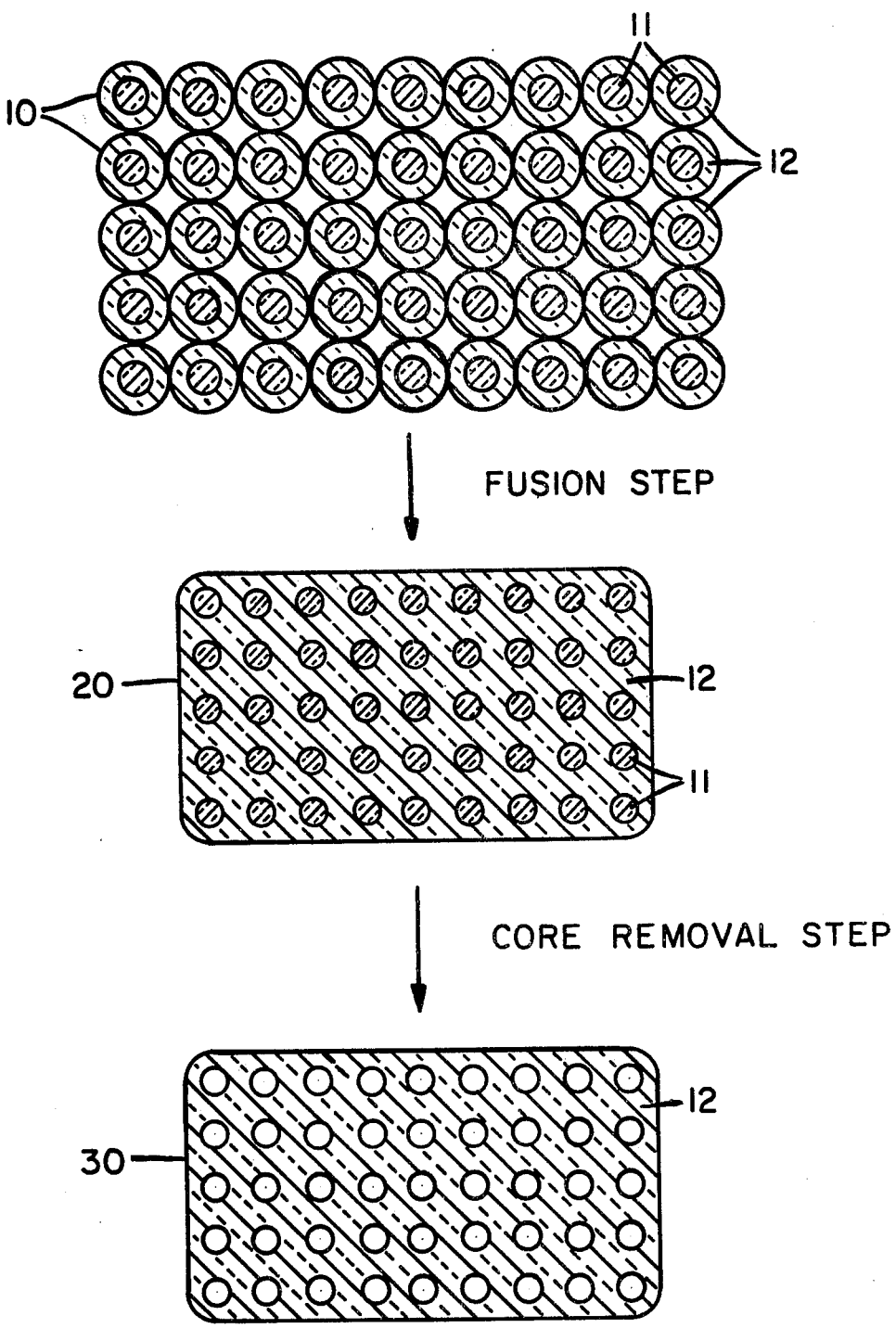

COMPOSITE GLASS ARTICLES FOR CHANNEL PLATE FABRICATION

BACKGROUND OF THE INVENTION

The present invention relates to composite glass articles suitable for the manufacture of glass channel plates and the like. Channel plates, bundles and other channeled bodies are useful for fabricating such products as electronic channel amplifiers, diffusion cells for gas purification, image transfer devices and other articles requiring intricate arrays of holes in glass difficult to obtain by mechanical machining methods.

One method for making channel plates or bundles involves sealing solid rods of leachable core glass within tubular pieces of non-leachable skin glass. The resulting glass subassemblies are then drawn, stacked, fused, redrawn, etc. to ultimately provide a composite glass article consisting of an interconnected glass matrix composed of the skin glass which encases an array of leachable glass core elements. The ends of these core elements are exposed and the elements are finally removed with a leaching medium such as nitric acid, leaving a glass body comprising an array of channels consisting of the interconnected skin glass matrix.

One such method for fabricating a channeled body is described in U.S. Pat. No. 3,294,504 to J. W. Hicks, Jr. Nitric acid-soluble glasses specified in that patent for use as leachable core elements or the like include two barium borosilicate glasses comprising substantial quantities of lanthanum and thorium oxides. The skin or matrix glass is a relatively durable alkali borosilicate glass.

Another method for producing a channeled body is described in U.S. Pat. No. 3,502,455 to W. L. Gardner. Again, a barium borosilicate glass comprising lanthanum and thorium is suggested for use as a leachable core glass, while a durable alkali borosilicate glass is used to provide the matrix.

Properties of major commercial importance for composites to be used in channel plate manufacture are the dissolution rate of the core glass and the difference between that rate and the dissolution rate of the matrix glass. Core glasses which dissolve comparatively rapidly in conventional leaching media offer a significant economic advantage in terms of processing time. A substantial difference between the dissolution rates of the core and matrix glasses is required, particularly where long core elements are to be removed, since any significant dissolution of the matrix glass produces channel tapering which is unacceptable for many applications.

It is also important that the coefficient of thermal expansion of the core glass be reasonably closely matched to that of the matrix glass so that excessive thermal stresses in the composite article may be avoided. Although the core glass is ultimately removed from the composite, excessive stress therein prior to core removal can produce fractures or make cutting of the composite impossible.

The process of fabricating composite articles for this use comprises fusing and drawing steps during which the core glasses are fused into the skin glasses, drawn with the skin glasses to reduce the cross-sectional area of the cores, and the core and skin combinations thereafter fused into an integral composite. It is desirable that the core glass have a softening point in the range of about 50°–100° C. higher than that of the skin glass in order to minimize distortion of the shape of the cores by the skin glass during these steps.

Finally, the core glass must be one which can be essentially entirely leached from the matrix glass without leaving harmful insoluble residues. The removal of such residues, particularly from very small channels, is both difficult and costly.

It is a principal object of the present invention to provide glass compositions for leachable core elements which meet the necessary thermal expansion and softening point requirements for composite manufacture, while at the same time offering improved leaching behavior to facilitate core removal.

It is a further object of the invention to provide glass compositions for leachable core elements at reduced cost as compared with glasses containing $La_2O_3$ and $ThO_2$.

It is a further object of the invention to provide composite glass articles suitable for the manufacture of channeled bodies which comprise glass core elements exhibiting improved leaching behavior.

Other objects and advantages of the invention will become apparent from the following description and examples thereof.

SUMMARY OF THE INVENTION

In accordance with the invention, leachable barium borosilicate core glasses are provided which exhibit improved leaching characteristics in combination with softening points and thermal expansion coefficients acceptable for fabricating composite glass articles used in the production of channeled bodies. The leachable core glasses of the invention are particularly useful in combination with lead silicate glasses of the kind employed as the matrix glass for channel amplifier applications, although they may also be employed in conjunction with other matrix glasses.

The invention specifically includes a composite glass article, suitable for the manufacture of a glass body comprising an array of channels, which consists of an interconnected glass matrix composed of a non-leachable glass in which is encased an array of glass core elements composed of a leachable barium borosilicate core glass. Also included within the scope of the invention are sealed core-and-skin subassemblies useful for making these composite glass articles.

Leachable core glass compositions providing improved leaching behavior and other essential properties consist essentially, in weight percent on the oxide basis, of about 38–64% $BaO$, 0–17% $CaO$, 0–3% $MgO$, 49–67% total of $BaO + CaO + MgO$, 8–45% $B_2O_3$, 6–34% $SiO_2$, and 32–51% total of $B_2O_3 + SiO_2$. Core elements may be provided from these compositions at reduced cost, inasmuch as the glass may be essentially free of the oxides $La_2O_3$ and $ThO_2$.

Glasses formed from compositions within the abovedescribed range typically exhibit average linear coefficients of thermal expansion not exceeding about $105 \times 10^{-7}$ per °C. over the range 0°–300° C. and softening points of 645° C. or above. These glasses also exhibit leaching characteristics such that they are dissolved at a rate of at least about 0.4 milligrams of glass per square centimeter of exposed surface area per minute during exposure of the glass to 1 Normal $HNO_3$ at 25° C. This combination of properties makes these glasses fully compatible with many of the commercially available lead silicate and other non-leachable glasses useful for matrix fabrication. Moreover, the dissolution rates thereof are substantially better, often by an order of magnitude, than one of the major prior art glasses previously employed for this purpose.

Optional oxide additions to the described core glass compositions may be made provided that the expansion, softening, and dissolution characteristics of the glass are not adversely affected thereby. Examples of useful additives include, but are not limited to: 0–12% $Al_2O_3$, 0–10% $TiO_2$, 0–7% $ZrO_2$, 0–3.5% $Na_2O$ and 0–4% ZnO by weight. In general such oxide additions should not exceed about 12%, so that the total BaO + CaO + MgO + $B_2O_3$ 30 $SiO_2$ content of the glass is at least about 88%.

Within the broad range of compositions above described, a leachable core glass may be provided which is closely compatible with an selected non-leachable matrix glass in terms of thermal expansion and softening point, while at the same time exhibiting improved acid dissolution characteristics permitting the manufacture of channeled articles of high quality.

DESCRIPTION OF THE DRAWING

The drawing consists of a diagrammatic representation of two process steps involved in the production of a channeled body, including schematic illustrations in plan view of the starting, intermediate and final products resulting therefrom.

In the fusion step shown, a number of glass subassemblies 10 are fused by heating into a composite glass article 20. Each glass subassembly 10 consists of a core element composed of a leachable core glass 11 disposed within and sealed to a skin element composed of skin glass 12. Core glass 11 is a leachable barium borosilicate glass having a composition as hereinabove described, and skin glass 12 is a non-leachable glass. In actuality, the core and skin elements are typically elongated, and are usually provided in the respective cylindrical and tubular configurations shown. However, elongated core and skin elements of non-circular cross-section could also be used.

The composite glass article 20 formed by the fusion step consists of a matrix composed of non-leachable glass 12 within which is encased an array of cores composed of leachable barium borosilicate glass 11. During the core removal step shown, the composite glass article 20 is immersed in an acid solution which leaches away glass 11 making up the core elements. The product is channel plate 30 which consists of a matrix composed of non-leachable glass 12 surrounding an array of channels resulting from the removal of the leachable core glass 11.

DETAILED DESCRIPTION

The most demanding application for composite glass articles provided in accordance with the present invention is in the manufacture of channel plates for channel amplifiers. Such plates comprise a very high number of channels (e.g., $10^6$ channels per square inch in one application), having very small diameters and high length-to-diameter ratios. The preparation of a truly high quality channel plate exhibiting minimum channel tapering in such cases requires a core glass exhibiting an acid dissolution rate which exceeds the acid dissolution rate of the surrounding non-leachable matrix glass by a factor of at least about $10^4$, preferably more.

For the purpose of the present description, a non-leachable skin or matrix glass is a glass having an acid dissolution rate not exceeding about $5 \times 10^{-5}$ mg cm$^{-2}$ min$^{-1}$ in 1 Normal aqueous $HNO_3$ at 25° C. Examples of non-leachable glass compositions useful as matrix glasses in accordance with the invention are set forth in parts by weight in Table I below. Included in the Table are the thermal expansion coefficients of each glass, expressed as an average over the temperature range 0°–300° C., and the temperature of the softening point of each glass in degrees C. The Table also reports acid dissolution rates where determined on individual glasses, in milligrams of glass per minute per square centimeter of glass surface area exposed to a 1N aqueous $HNO_3$ solution at 25° C. The selection of acid and exposure temperature for reporting these dissolution rates is arbitrary, but provides an accurate and convenient means of comparing the acid dissolution properties of various glasses under conditions not greatly dissimilar from those of actual use.

TABLE I

| | Matrix Glass Compositions | | | |
|---|---|---|---|---|
| | A | B | C | D |
| PbO | 50.7 | 45.0 | 30.0 | — |
| BaO | 2.0 | — | — | 11.8 |
| $SiO_2$ | 39.0 | 47.0 | 57.0 | 67.4 |
| $K_2O$ | 5.3 | 8.0 | — | — |
| $Rb_2O$ | 2.0 | — | — | — |
| $Al_2O_3$ | — | — | 1.0 | 4.6 |
| $Li_2O$ | — | — | — | 6.9 |
| $Na_2O$ | — | — | 8.0 | 7.0 |
| Other | — | — | — | 3.7 |
| Softening Point (° C) | 596 | 650 | 630 | 647 |
| Thermal Expansion Coefficient $\times 10^7$ (° $C^{-1}$) | 88.1 | 82.7 | 89.5 | 90.0 |
| Dissolution Rate - 1N $HNO_3$ at 25° C (mg cm$^{-2}$ min$^{-1}$) | $4.17 \times 10^{-5}$ | $3.59 \times 10^{-6}$ | — | — |

Compositions such as shown in Table I may be melted and drawn into tubing using conventional glass melting and forming processes. Thus they may readily be used to provide glass sleeves into which leachable core elements in the form of rods may be sealed for subsequent processing. A glass having a composition approximating that of Glass A of Table I has been used in the prior art for this purpose.

Preferred matrix glasses for channel amplifier fabrication are lead silicate glasses such as glass A and B of Table I. However, glasses such as C and D of Table I may be used to fabricate other types of channeled bodies. Of course, glasses other than those specifically shown in Table I could also be used in the fabrication of channeled articles, provided their properties meet the expansion, softening and dissolution requirements for matrix glasses. In general, compatibility with the leachable core glasses of the present invention dictates a preferred range of matrix glass properties which include an expansion coefficient of not less than about 70 $\times 10^{-7}$/° C., a softening temperature not exceeding about 650° C., and a dissolution rate not exceeding about $5 \times 10^{-5}$ milligrams of glass per square centimeter of exposed surface area per minute of exposure to 1N $HNO_3$ at 25° C. Lead silicate glasses exhibiting these properties are particularly preferred.

A core glass composition which has been previously employed in combination with Glass A of Table I to manufacture channel plates for channel amplifiers has a composition, in weight percent, of about 47.8% BaO, 16.5% $B_2O_3$, 14.1% $SiO_2$, 11.0% $La_2O_3$ and 9.5% $ThO_2$. This glass has an average linear coefficient of thermal expansion of about 94.3 × 10$^{-7}$/° C. over the temperature range 0–300° C., and has a softening temperature of about 690° C. However, its dissolution rate in 1N HNO$_3$ at 25° C. is about 0.29 milligrams per square centimeter per minute of exposure. This dissolution rate is marginal for the manufacture of high quality channel plates, and a substantially faster dissolution rate would be preferred. Also, the use of La$_2$O$_3$ and ThO$_2$ add significantly to the batch cost of this glass.

A number of different core glass compositions within the scope of the invention which may be used to advantage in combination with matrix glasses such as shown above in Table I are set forth in Table II below. The compositions of these glasses are reported in parts by weight on the oxide basis. Table II includes an average linear coefficient of thermal expansion (0°–300° C.) for each glass, as well as a softening point temperature and an acid dissolution value determined by exposure to 1N HNO$_3$ at 25° C.

Glasses such as shown in Table II may be melted in pots, tanks, crucibles or other conventional units in accordance with standard glass melting practice. The melts may readily be formed into glass rods of a size suitable for fusing to matrix glass tubing by casting, drawing, or any other of the various techniques known to be useful for this purpose.

TABLE II

|  | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| BaO | 50.8 | 38.0 | 48.7 | 51.1 | 51.3 | 50.2 | 50.5 | 45.7 | 44.7 | 45.2 | 46.7 | 42.5 | 61.0 | 64.0 | 58.8 |
| CaO | 6.2 | 13.9 | 5.9 | 6.2 | 6.3 | 6.1 | 6.2 | 16.3 | 6.5 | 6.6 | 5.7 | 15.6 |  |  |  |
| B$_2$O$_3$ | 23.1 | 25.9 | 22.1 | 19.3 | 15.4 | 15.2 | 19.1 | 12.2 | 32.4 | 24.6 | 21.2 | 8.6 | 20.8 | 19.2 | 20.8 |
| SiO$_2$ | 19.9 | 22.3 | 19.1 | 23.4 | 23.4 | 22.9 | 19.8 | 21.0 | 14.0 | 21.2 | 18.3 | 33.3 | 17.9 | 16.6 | 17.3 |
| MgO |  |  |  |  |  |  |  |  | 2.3 | 2.4 |  |  |  |  |  |
| TiO$_2$ |  |  | 4.2 |  |  |  | 4.4 |  |  |  |  | 8.1 |  |  | 3.8 |
| Al$_2$O$_3$ |  |  |  |  |  | 5.6 |  | 5.9 |  |  |  |  |  |  |  |
| ZrO$_2$ |  |  |  |  |  |  |  |  |  |  |  |  |  |  |  |
| ZnO |  |  |  |  |  |  |  |  |  |  |  |  |  |  |  |
| Softening Point (° C.) | 716 | 714 | 707 | 713 | 714 | 711 | 706 | 709 | 705 | 708 | 721 | 754 | 681 | 671 | 692 |
| Thermal Expansion Coefficient ×10$^7$, 0–300° C.) | 82.7 | 84.5 | 90.1 | 88.8 | 93.7 | 88.6 | 91.0 | 99.9 | 72.5 | 85.6 | 86.6 | 92.6 | 93.7 | 100.2 | 93.4 |
| Dissolution Rate - 1N HNO$_3$ at 25° C. (mg cm$^{-2}$ min$^{-1}$) | 3.06 | 3.18 | 1.84 | 4.91 | 4.19 | 2.22 | 1.87 | 7.13 | 1.48 | 3.6 | 4.53 | 3.11 | 17.9 | 18.6 | 3.48 |

|  | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| BaO | 57.6 | 61.1 | 58.8 | 54.1 | 61.5 | 58.2 | 55.6 | 56.7 | 45.2 | 59.3 | 47.6 | 48.1 | 45.7 | 49.1 | 45.5 |
| CaO |  |  |  |  |  |  |  |  | 16.5 | 7.2 | 5.8 | 5.9 | 5.6 | 6.0 | 16.6 |
| B$_2$O$_3$ | 19.6 | 18.5 | 20.0 | 24.6 | 17.4 | 19.8 | 18.9 | 19.3 | 20.5 | 18.0 | 21.6 | 21.8 | 20.7 | 14.9 | 16.5 |
| SiO$_2$ | 16.9 | 15.9 | 17.3 | 21.2 | 21.1 | 17.1 | 16.3 | 16.7 | 17.7 | 15.5 | 18.6 | 18.9 | 17.9 | 19.2 | 21.4 |
| MgO |  |  |  |  |  |  |  |  |  |  |  |  |  |  |  |
| TiO$_2$ |  |  |  |  |  |  | 3.6 | 7.4 |  |  |  |  | 4.0 | 4.3 |  |
| Al$_2$O$_3$ |  | 4.5 |  |  |  | 4.8 |  |  |  |  |  | 5.3 |  |  |  |
| ZrO$_2$ | 5.8 |  |  |  |  |  | 5.6 |  |  |  | 6.4 |  |  | 6.1 | 6.6 |
| ZnO |  |  | 3.9 |  |  |  |  |  |  |  |  |  |  |  |  |
| Softening Point (° C.) | 678 | 668 | 672 | 694 | 697 | 679 | 714 | 704 | 698 | 669 | 718 | 700 | 719 | 730 | 692 |
| Thermal Expansion Coefficient (×10$^7$, 0–300° C.) | 92.3 | 96.9 | 95.7 | 88.0 | 90.2 | 90.3 | 87.1 | 87.1 | 95.4 | 102.5 | 87.0 | 86.1 | 86.2 | 89.1 | 100.1 |
| Dissolution Rate - 1N HNO$_3$ at 25° C. (mg cm$^{-2}$ min$^{-1}$) | 3.71 | 6.28 | 16.2 | 4.66 | 3.78 | 2.81 | 0.44 | 0.4 | 7.54 | 18.8 | 1.37 | 1.22 | 0.42 | 0.52 | 18.6 |

|  | 31 | 32 | 33 | 34 | 35 | 36 | 37 | 38 | 39 | 40 | 41 | 42 | 43 |
|---|---|---|---|---|---|---|---|---|---|---|---|---|---|
| BaO | 45.7 | 44.9 | 49.1 | 49.6 | 50.1 | 49.6 | 48.1 | 42.6 | 38.6 | 40.4 | 41.5 | 59.6 | 58.3 |
| CaO | 16.7 | 16.4 |  |  |  |  | 5.9 | 6.2 | 14.1 | 14.8 | 15.2 |  |  |
| B$_2$O$_3$ | 12.5 | 16.3 | 44.5 | 37.5 | 30.3 | 27.1 | 21.8 | 23.2 | 13.2 | 8.2 | 8.4 | 21.7 | 22.3 |
| SiO$_2$ | 25.1 | 17.6 | 6.4 | 12.9 | 19.6 | 23.3 | 21.2 | 20.0 | 34.1 | 24.6 | 25.3 | 17.5 | 17.0 |
| MgO |  |  |  |  |  |  |  | 2.2 |  |  |  |  |  |
| TiO$_2$ |  | 4.7 |  |  |  |  |  |  |  |  | 9.6 |  |  |
| Al$_2$O$_3$ |  |  |  |  |  |  | 5.3 | 5.7 | 12.0 |  |  |  |  |
| Na$_2$O |  |  |  |  |  |  |  |  |  |  |  | 1.2 | 2.3 |
| Softening Point (° C.) | 711 | 684 | 666 | 676 | 715 | 724 | 697 | 675 | 754 | 772 | 748 | 665 | 652 |
| Thermal Expansion Coefficient (×10$^7$, 0–300° C.) | 100.6 | 102.1 | 78.9 | 84.0 | 77.5 | 76.7 | 86.9 | 90.3 | 87.5 | 90.5 | 98.5 | 97.9 | 99.0 |
| Dissolution Rate-1N HNO at 25° C. (mgcm$^{-2}$min$^{-1}$) | 19.9 | 9.58 | 6.51 | 7.15 | 2.45 | 1.77 | 1.55 | 1.88 | 1.36 | 0.81 | 0.52 | 12.0 | 13.5 |

|  | 44 | 45 | 46 |
|---|---|---|---|
| BaO | 52.3 | 49.3 | 48.6 |
| CaO | — | 6.0 | 5.9 |
| B$_2$O$_3$ | 27.1 | 29.8 | 29.5 |
| SiO$_2$ | 17.6 | 12.9 | 12.7 |
| Na$_2$O | 3.0 | 2.0 | 3.3 |
| Softening Point (° C) | 670 | 665 | 648 |
| Thermal Expansion Coefficient (×10$^7$, 0–300° C.) | 90.5 | 93.0 | 95.7 |
| Dissolution Rate - 1N HNO$_3$ at 25° C. |  |  |  |

TABLE II-continued

| (mg cm$^{-1}$ min$^{-1}$) | 6.5 | 8.9 | 10.7 |
| --- | --- | --- | --- |

From thermal expansion, softening point, and acid dissolution data such as shown above in Table II it appears that leachable core glasses exhibiting expansion coefficients below about $105 \times 10^{-7}/°$ C., softening temperatures above 645° C., and acid dissolution rates of at least about 0.4 milligrams per square centimeter per minute in 1N HNO$_3$ at 25° C. may readily be provided within the glass composition range hereinabove set forth. Of course the particular leachable core glass composition selected for use will depend primarily on the softening point, expansion and acid dissolution properties of the skin glass to be employed in forming the matrix.

The fabrication of a composite glass article which may be used to manufacture a channel plate or other channeled body may be carried out in accordance with conventional procedures described in the aforementioned United States Patents and in the literature. No special fabrication, preparation, or leaching techniques are required and a wide variety of channel shapes, including cylindrical, polygonal, and annular configurations, may be provided. However, as previously suggested, the best results in terms of product quality are obtained by selecting a core glass having an acid dissolution rate which exceeds that of the matrix glass by at least a factor of about 10$^4$, and by maintaining the softening point of the core glass in the preferred range of about 50°-100° C. above that of the matrix glass.

I claim:

1. A composite glass article suitable for the manufacture of a glass body comprising an array of channels which consists of:
   (a) an interconnected glass matrix composed of a non-leachable lead silicate matrix glass having an average linear coefficient of thermal expansion over the temperature range 0°-300° C. of not less than about $70 \times 10^{-7}/°$ C., a softening point not exceeding about 650° C., and a dissolution rate in 1N HNO$_3$ not exceeding about $5 \times 10^{-5}$ milligrams per square centimeter of exposed surface area per minute at 25° C., and
   (b) an array of leachable core glass elements encased in said glass matrix, each of said core glass elements being composed of a glass consisting essentially, in weight percent on the oxide basis, of about 38-64% BaO, 0-17% CaO, 0-3% MgO, 49-67% total of BaO + CaO + MgO, 8-45% B$_2$O$_3$, 6-34% SiO$_2$, 32-51% total of B$_2$O$_3$ + SiO$_2$, at least 88% total of BaO + CaO + MgO + B$_2$O$_3$ + SiO$_2$, 0-12% Al$_2$O$_3$, 0-10% TiO$_2$, 0-7% ZrO$_2$, 0-3.5% Na$_2$O and 0-4% ZnO, said glass having an average linear coefficient of thermal expansion over the temperature range 0-300° C. not exceeding about $105 \times 10^{-7}/°$ C., a softening point of at least about 645° C., a dissolution rate in 1N HNO$_3$ of at least about 0.4 milligrams per square centimeter of exposed surface area per minute at 25° C., and being essentially free of La$_2$O$_3$ and ThO$_2$.

2. A composite glass article in accordance with claim 1 wherein the dissolution rate of said core glass in 1N HNO$_3$ at 25° C. exceeds that of said matrix glass by at least a factor of 10$^4$.

3. A composite glass article in accordance with claim 1 wherein the softening point of said core glass ranges between 50°-100° C. above the softening point of said matrix glass.

4. A glass substantially consisting of a leachable core element disposed within and sealed to a skin element, wherein the skin element is composed of a non-leachable lead silicate skin glass having an average linear coefficient of thermal expansion over the range 0°-300° C. of not less than about $70 \times 10^{-7}/°$ C., a softening point not exceeding about 650° C., and a dissolution rate in 1N HNO$_3$ not exceeding about $5 \times 10^{-5}$ milligrams per square centimeter per minute at 25° C., and wherein the leachable core element is composed of a core glass consisting essentially in weight percent on the oxide basis, of about 38-64% BaO, 0-17% CaO, 0-3% MgO, 49-67% total of BaO + CaO + MgO, 8-45% B$_2$O$_3$, 6-34% SiO$_2$, 32-51% total of B$_2$O$_3$ + SiO$_2$, at least 88% total of BaO + CaO + MgO + B$_2$O$_3$ + SiO$_2$, 0-12% Al$_2$O$_3$, 0-10% TiO$_2$, 0-7% ZrO$_2$, 0-3.5% Na$_2$O and 0-4% ZnO, said core glass having an average linear coefficient of thermal expansion over the temperature range 0°-300° C. not exceeding about $105 \times 10^{-7}/°$ C., a softening point of at least about 645° C., a dissolution rate in 1N HNO$_3$ of at least about 0.4 milligrams per square centimeter of exposed surface area per minute at 25° C., and being essentially free of La$_2$O$_3$ and ThO$_2$.

* * * * *

UNITED STATES PATENT AND TRADEMARK OFFICE
CERTIFICATE OF CORRECTION

PATENT NO. : 4,112,170

DATED : September 5, 1978

INVENTOR(S) : Herbert E. Rauscher

It is certified that error appears in the above-identified patent and that said Letters Patent are hereby corrected as shown below:

Column 2, line 57, "abovedescribed" should be -- above-described --.

Column 3, line 12, "$B_2O_3$ 30 $SiO_2$" should be -- $B_2O_3$ + $SiO_2$ --.

Signed and Sealed this

*Thirtieth* Day of *October 1979*

[SEAL]

*Attest:*

RUTH C. MASON
*Attesting Officer*

LUTRELLE F. PARKER
*Acting Commissioner of Patents and Trademarks*